United States Patent [19]

Grynberg et al.

[11] Patent Number: 4,734,796

[45] Date of Patent: Mar. 29, 1988

[54] TECHNIQUE FOR PREVENTING UNAUTHORIZED COPYING OF INFORMATION RECORDED ON A RECORDING MEDIUM AND A PROTECTED RECORDING MEDIUM

[76] Inventors: Amiram Grynberg, 24 Rimon St., Neve Monoson; Henry Klein, 6 Hadeganiot St., Rehovot, both of Israel

[21] Appl. No.: 529,683

[22] Filed: Sep. 6, 1983

[30] Foreign Application Priority Data

Apr. 14, 1983 [IL]  Israel .................................. 68401
Jun. 15, 1983 [IL]  Israel .................................. 68989

[51] Int. Cl.$^4$ ...................... G11B 15/04; G11B 19/04; G11B 5/09
[52] U.S. Cl. ...................................... 360/60; 360/133; 360/135
[58] Field of Search ................... 360/60, 53, 132, 133, 360/135

[56] References Cited

U.S. PATENT DOCUMENTS

| | | | |
|---|---|---|---|
| 3,781,835 | 12/1973 | Dion et al. ............................ | 360/25 |
| 4,040,099 | 8/1977 | Cook ..................................... | 360/29 |
| 4,100,575 | 7/1978 | Morio ............................. | 360/37.1 X |
| 4,163,253 | 7/1979 | Morio ............................. | 360/37.1 X |
| 4,462,078 | 7/1984 | Ross ..................................... | 364/300 |
| 4,477,848 | 10/1984 | McWhirter et al. .................. | 360/60 |
| 4,577,289 | 3/1986 | Comerford et al. ................. | 364/900 |
| 4,584,641 | 4/1986 | Guglielmino ................ | 364/200 MS |

FOREIGN PATENT DOCUMENTS 1529939  10/1975  United Kingdom .................. 360/60

OTHER PUBLICATIONS

IBM-TDB—vol. 23, No. 2, 7/80, Jone et al., Apparatus for Generating Desired Physical Defects.

Primary Examiner—Stuart N. Hecker
Assistant Examiner—Alyssa H. Bowler
Attorney, Agent, or Firm—Cushman, Darby & Cushman

[57] ABSTRACT

A method for prevention of unauthorized copying from information recording media, such as diskettes, comprising the steps of altering the information storage characteristics of the information recording media at selectable locations thereon, analyzing the information recording media after the alteration to provide a storable indication of the precise locations of the alteration, and recording onto the altered recording media information the copying of which is to be resisted, the information thus recorded including said storable indication of the precise locations of the alteration and instructions to user apparatus to verify the altered status of the recording media at said precise locations. A protected recording medium is also disclosed and claimed.

8 Claims, 4 Drawing Figures

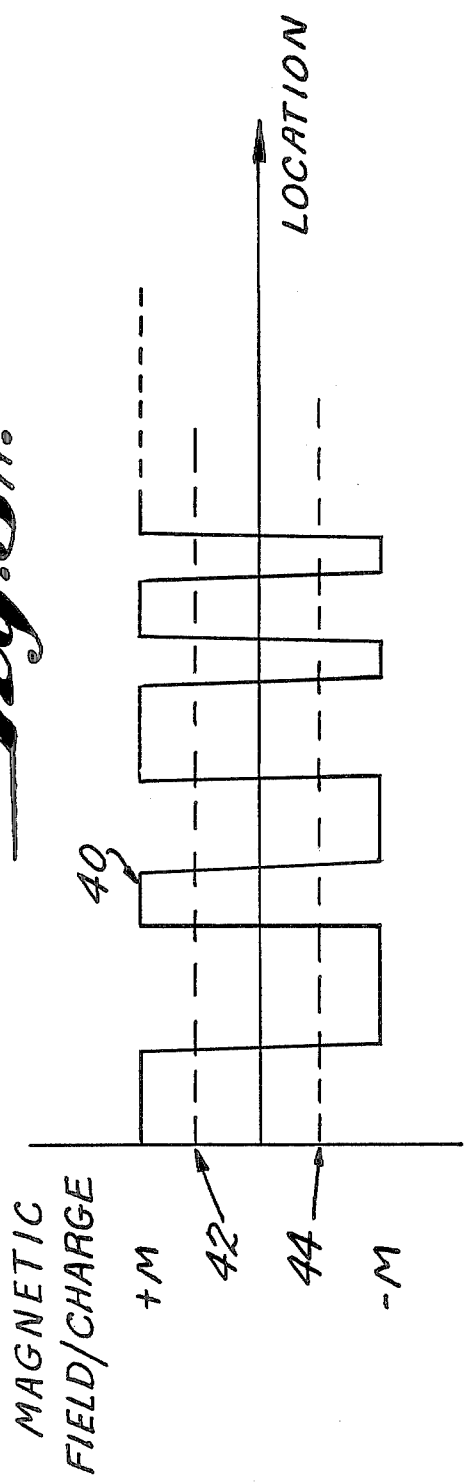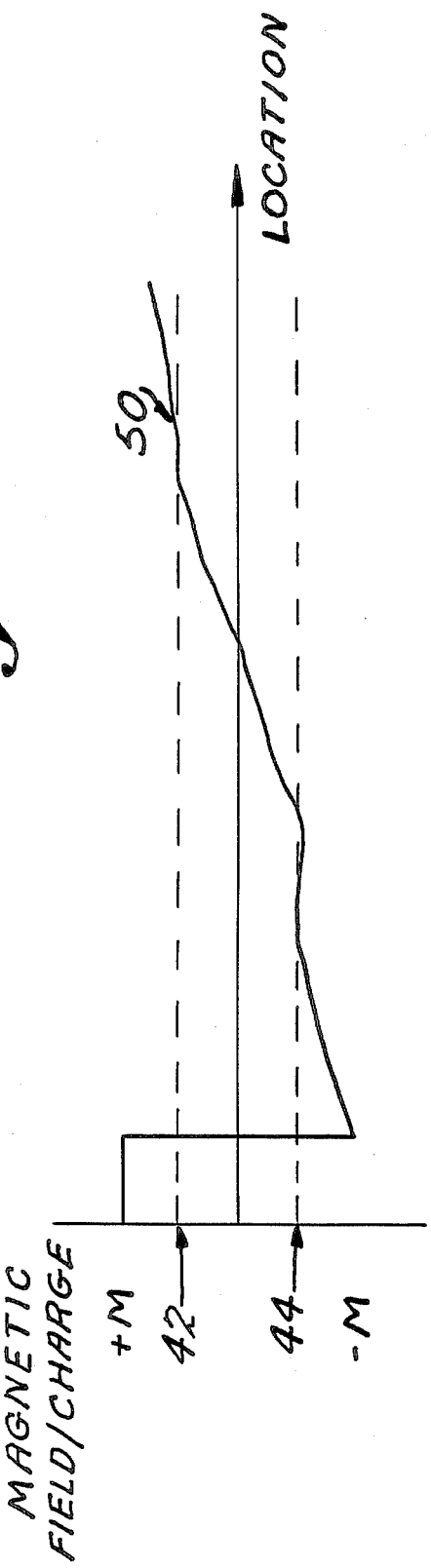

TECHNIQUE FOR PREVENTING UNAUTHORIZED COPYING OF INFORMATION RECORDED ON A RECORDING MEDIUM AND A PROTECTED RECORDING MEDIUM

FIELD OF THE INVENTION

The present invention relates to techniques for preventing use of unauthorized copies of information recorded on a recording medium and also to a protected recording medium which resists unauthorized copying.

BACKGROUND OF THE INVENTION

The use of magnetic recording media, such as diskettes, to record computer programs has become extremely widespread in recent years. Conventionally diskettes are characterized, inter alia, that the contents thereof may be copied readily on any conventional diskette drive and associated computer.

The ease of copying the contents of diskettes and other magnetic recording media causes serious problems to the developers and owners of proprietary information which is stored on such media who seek to restrict the reproduction and distribution of the information content of the diskettes, as to customers who have paid a license or user fee.

From a legal standpoint, efforts have been made to draft and enforce limited use licenses which purport to restrict unauthorized copying and dissemination. In practice, however, enforcement is nearly impossible, due to the enormous numbers of diskettes in circulation and the extremely large numbers of customers involved.

Efforts have been made to prevent copying of information from diskettes by encoding thereon instructions or information which normally prevent writing of the contents of the diskette on another diskette. Although such techniques are in relatively widespread use, computer programs have been developed and are being distributed which overcome these write-prevent instructions.

SUMMARY OF THE INVENTION

The present invention seeks to provide a technique for prevention of unauthorized copying from information recording media, and in particular magnetic recording media such as diskettes. There is thus provided in accordance with an embodiment of the present invention, a method for prevention of unauthorized copying from information recording media, such as diskettes comprising the steps of altering the information storage characteristics of the information recording media at selectable locations thereon, analyzing the information recording media after the alteration to provide a storable indication of the precise locations of the alteration, and recording onto the altered recording media information the copying of which is to be resisted, the information thus recorded including said storable indication of the precise locations of the alteration and instructions to user apparatus to verify the altered status of the recording media at said precise locations.

In accordance with a preferred embodiment of the invention, the step of altering comprises the step of altering the information storage characteristics in a normally non-reversible manner.

In accordance with another preferred embodiment of the invention, the step of altering comprises the provision of a variable signature together with the information recorded on the recording medium, which variable signature is characterized in that it normally varies each time it is read and in that it is non transferable when information on the medium is copied in the usual manner. In this embodiment the instructions to the user apparatus for verification of the altered status include multiple read and compare instructions with regard to the variable signature, whereby the absence of variations in the signature, indicating copying, disables the program operation.

In accordance with a preferred embodiment of the invention, the storable indication is included in the recorded information in a manner such that it is normally inaccessible to a user of the recording media.

Further in accordance with a preferred embodiment of the present invention, each information bearing recording medium has a different alteration signature, which may be randomly applied thereto. For the purposes of the present specification and claims the term "random" includes pseudorandom.

Further in accordance with a preferred embodiment of the present invention, the normally non-reversible alterations may be applied by physical alteration of the recording medium, such as by scratching or heating thereof.

In accordance with the other preferred embodiment of the invention, the variable signature may be provided as a slowly varying analog magnetic signal, and may be provided by bringing a magnet close to a portion of the recording medium.

Additionally in accordance with an embodiment of the present invention, the storable indication is recorded in a manner that renders it normally inaccessible to a user of the recording media.

Further in accordance with a preferred embodiment of the present invention there is provided an information bearing recording medium having at known random locations thereon altered information storage characteristics, the recording medium bearing information which includes at least one of a storable indication of the precise locations of the alteration, and instructions to user apparatus to verify the altered status of the recording media at said precise locations.

Further in accordance with an embodiment of the invention, the altered information storage locations bear non-reversible deformations.

Additionally in accordance with another embodiment of the invention, the altered information storage locations bear variable signatures which produce differing read outputs, each time they are read and are not copyable onto another medium by conventional information copying techniques.

Additionally in accordance with an embodiment of the present invention the storable indication is included in the information recorded on the media in a manner so as to be normally inaccessible to users of the media.

BRIEF DESCRIPTION OF THE DRAWINGS

The present invention will be understood and appreciated more fully from the following detailed description taken in conjunction with the drawing in which:

FIGS. 3A and 3B are illustrations of a magnetic digital information pattern on a normally operative portion of a conventional diskette and the magnetic signal pattern on a portion of such a diskette having locations altered in accordance with an another embodiment of the present invention, respectively.

DETAILED DESCRIPTION OF THE INVENTION

Figure 1:
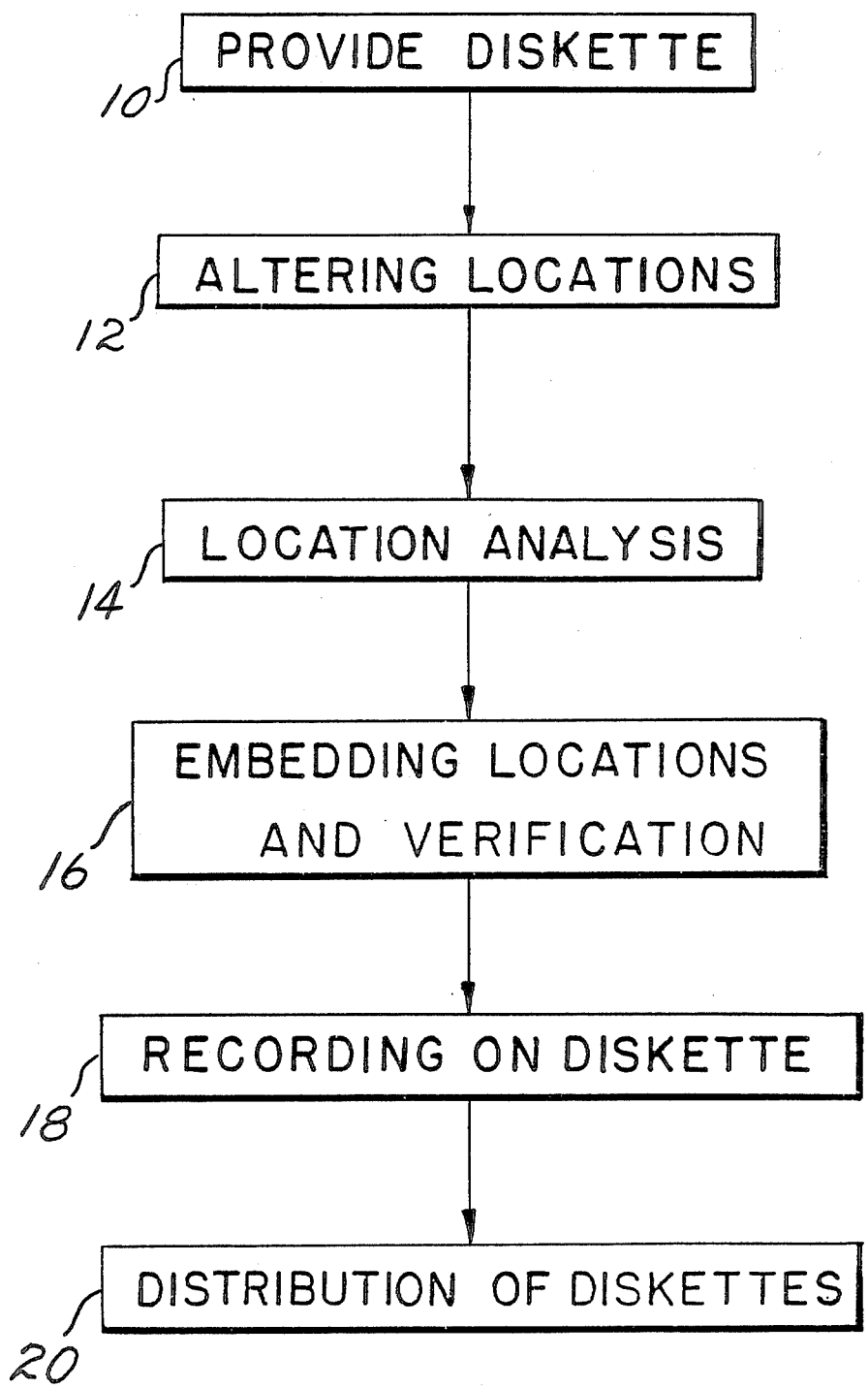
FIG. 1 is a flow chart illustrating the steps of the technique of the present invention.

Reference is now made to FIG. 1 which illustrates in flow chart form, a technique for resisting unauthorized copying of information recorded on recording media such as diskettes in accordance with a preferred embodiment of the present invention. The technique comprises the initial step of providing a suitable recording medium. Such a medium may be a diskette or disk or alternatively magnetic recording tape or any other magnetic or non-magnetic recording medium. For the sake of clarity and simplicity in explanation, the invention will be described hereinafter with particular reference to diskettes, it being understood that the invention is applicable equally to other types of electromagnetic recording media as well.

Following the initial step of providing a diskette, indicated by reference numeral 10, locations on the diskette are subject to alteration of their information bearing characteristics.

According to one preferred embodiment of the invention, the alteration is such that the altered locations acquire READ ONLY characteristics. This alteration, indicated by reference numeral 12, in a simple sense, may comprise scratching or cutting the surface of the diskette in any suitable desired configuration, which does not affect the operation of the diskette in storing and permitting the reading of information on the non-altered locations on the diskette. Alternatively, the alteration may be achieved by non-contacting techniques such as the application of heat or radiation to locations on the diskette. Preferably the selection of the locations to be altered is random or pseudorandom and differs from diskette to diskette, such that each diskette has its own signature. Since the location does not have to be predetermined, manufacture in accordance with the invention is relatively simple and inexpensive.

According to a preferred embodiment of the present invention, the alteration of the diskette is permanent and non-reversible. Alternatively the alteration may be such as to be normally non-reversible using normal computer media techniques but subject to reversibility using other techniques. One example of such alteration is alteration by heating of a plastic recording medium, which could conceivably be reversed by additional heating under certain conditions.

Following alteration of the diskette as aforesaid, the diskette is subject to location analysis, which provides a storable indication of the precise locations on the diskette having altered information storage characteristics. This step, indicated by reference numeral 14, may be achieved by reading of the altered diskette by the use of a conventional diskette drive and computer. Alternatively, any other suitable analysis technique may be used.

Following location analysis, information sought to be protected against unauthorized copying is recorded on the diskette. Also recorded on the diskette together with the other information is the indication of the locations of alteration as well as instructions to the computer to verify the altered condition of such locations and to proceed only upon such verification. Both the indication of the locations of alteration and the verification instructions are embedded in the user program stored on the diskette by conventional programming techniques, rendering it extremely difficult, time consuming and expensive to access this information for modification or bypass thereof.

Any effort to copy the diskette produces copying of the information together with spurious information resulting from the altered locations. Since it is very difficult, if not impossible, to reproduce the alterations, or to access either the storable indications of locations or the verification instructions on the diskette once it has been recorded, the user cannot overcome the verification process.

Figure 2:
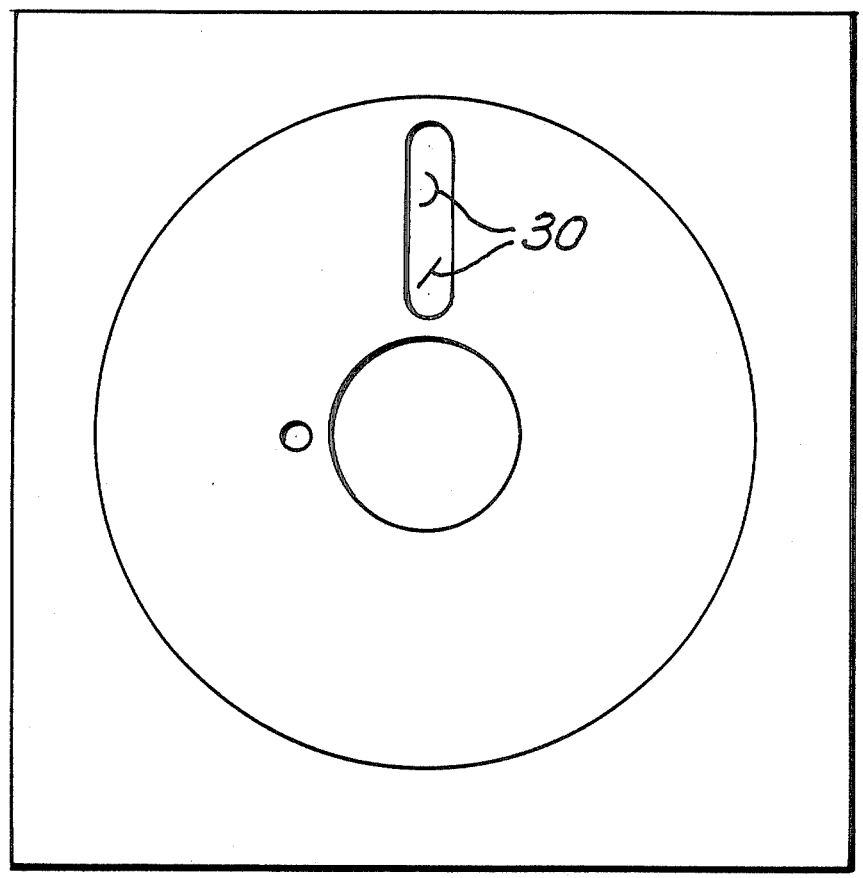
FIG. 2 is an illustration of a copying resistant diskette constructed and operative in accordance with an embodiment of the present invention.

Reference is now made to FIG. 2 which illustrates a diskette which has been altered by scratching to alter the information storage capabilities of certain locations thereof. The scratches, indicated by reference numeral 30, may be appreciated to be somewhat exaggerated in order for them to be seen in the drawing. They need not necessarily be as broad as shown. It is appreciated that, as noted above, the alternation of locations on the diskette can alternatively be realized by any other suitable techniques.

According to another preferred embodiment of the invention, instead of the READ ONLY alteration technique described above, an alternative alteration technique may be employed. One preferred alteration technique is to provide at selected information storage locations a variable signature, which signature provides a different output each time it is read and which signature, by its nature, is not copyable by normal copying techniques useful for copying information, from the original altered medium onto another medium.

An understanding of the variable signature technique may be achieved from a consideration of FIGS. 3A and 3B. FIG. 3A illustrates a normal magnetic charge pattern 40 on a track of recording medium having digitally encoded information stored thereon. It is noted that the positive and negative portions of the pattern 40 have defined peaks and widths. The sensing thresholds of conventional reading apparatus are indicated by lines 42 and 44. At these charge levels which are expressed in electrical voltages, the crossings of the pattern 40 are sensed to provide digital outputs signals. It is noted that the threshold levels are selected to correspond to a charge level less than the normal peak so as to eliminate flutter about the threshold and the reception of spurious signals.

If, however, in accordance with a preferred embodiment of the present invention, the magnetic arrangement at a given set of locations along the recording track of the medium is disturbed, such as by bringing a magnet into proximity of the medium at such locations, a different type of pattern 50 is produced, which does not have well defined peaks and widths but instead does in fact display flutter about the threshold lines 42 and 44, as seen in FIG. 3B. This flutter produces a spurious signal output which, has been found by applicants to vary substantially with each reading, due to the high sensitivity of the reading apparatus.

Another feature of pattern 50, is that it is not susceptible of copying onto another medium by conventional copying techniques which are suitable and in fact used for copying pattern 40.

The variable signature alteration technique is followed by a location analysis step as described hereinabove in connection with the READ ONLY alteration technique.

This step is followed by an embedding step similar to that described hereinabove, but here, there is embedded together with the location, a instruction to carry out multiple readings of the variable signature altered locations and to compare the received signals. Only if the received signals differ from each other on the multiple readings is operation of the program enabled.

Since the variable signature altered locations are not susceptible of being copied together with the remaining digital stored information on the diskette, copying of the diskette produces a copy without the variable signature features. The computer reading such a copy will not receive varying outputs upon multiple readings and thus use of the program stored on the copy is not enabled.

It will be appreciated by persons skilled in the art that the present invention is not limited to what has been particularly shown and described hereinabove. Rather the scope of the present invention is defined only by the claims which follow:

What is claimed is:

1. A method for prevention of usage of unauthorized copies of information recording media, such as diskettes, comprising the steps of:
    producing a variable signature on the information recording medium, which variable signature provides a different signal output upon multiple readings:
    analyzing the information recording media after producing the variable signature to provide a storable indication of the precise locations of the variable signature;
    recording onto the signature bearing recording media information the copying of which is to be resisted, the information thus recorded including said storable indication of the precise location of the variable signature; and
    embedding onto the signature bearing recording medium instructions requiring:
    reading the information recording medium at the location of the variable signature a plurality of times;
    comparing the read signatures obtained upon said plurality of readings to determine whether variation is present therebetween; and
    providing an output indication permitting usage of information stored on said information recording medium only in response to sensed variation in the read signatures upon said plurality of readings.

2. A method according to claim 1 and also comprising the step of embedding the storable indication within the information recorded on the media.

3. A method according to claim 2 and wherein said step of embedding includes the step of embedding verify instructions in said program, said verifying instructions including instructions to read said selectable locations a plurality of times, compare the outputs produced in response to said readings and to enable operation of the program only if variations exist in said outputs.

4. A method according to claim 1 and wherein each of said information bearing media has a different altered signature, which may be randomly applied thereto.

5. A method according to claim 1 and wherein said step of producing a variable signature comprises the application of a magnetic field to said selectable locations. outputs produced in response to said readings and to enable operation of the program only if variations exist in said outputs.

6. A method according to claim 1 and wherein said storable indication is embedded in a computer program.

7. A copying resistant recording medium comprising:
    a recording medium including at least one known random location thereof, a variable signature operative to provide different outputs upon multiple readings thereof, said recording medium bearing information which includes a storable indication of the precise location of the variable signature and instructions requiring:
    reading the information recording medium at the location of the variable signature a plurality of times;
    comparing the read signatures obtained upon said plurality of readings to determined whether variation is present therebetween; and
    providing an output indication permitting usage of information stored on said information recording medium only in response to sensed variation in the read signatures upon said plurality of readings.

8. A copying resistant recording medium according to claim 7 and wherein said recording medium also bears information which includes instructions to user apparatus to verify the altered status of the recording media at said precise locations.

* * * * *